United States Patent [19]

Naumann et al.

[11] Patent Number: 5,320,190
[45] Date of Patent: Jun. 14, 1994

[54] ARRANGEMENT FOR COOLING THE BATTERY OF A MOTOR VEHICLE

[75] Inventors: Fritz Naumann, Stammham; Hans-Gunther Haldenwanger, Ingolstadt, both of Fed. Rep. of Germany

[73] Assignee: Audi AG, Ingolstadt, Fed. Rep. of Germany

[21] Appl. No.: 946,323

[22] PCT Filed: May 17, 1991

[86] PCT No.: PCT/EP91/00925

§ 371 Date: Nov. 6, 1992

§ 102(e) Date: Nov. 6, 1992

[87] PCT Pub. No.: WO91/18759

PCT Pub. Date: Dec. 12, 1991

[30] Foreign Application Priority Data

Jun. 8, 1990 [DE] Fed. Rep. of Germany ....... 4018347

[51] Int. Cl.$^5$ ............................................. B60K 11/00
[52] U.S. Cl. .................................. 180/68.2; 180/68.5
[58] Field of Search ..................... 180/68.1, 68.2, 68.5, 180/68.4; 296/37.1; 248/503

[56] References Cited

U.S. PATENT DOCUMENTS

| | | |
|---|---|---|
| 1,768,123 | 5/1927 | MacMiller . |
| 2,104,765 | 2/1936 | Saunders ............................ 180/68.5 |
| 2,104,766 | 1/1938 | Saunders ............................ 180/68.5 |
| 2,104,767 | 1/1938 | Saunders ............................ 180/68.5 |
| 2,104,768 | 1/1938 | Saunders ............................ 180/68.5 |
| 2,104,770 | 1/1938 | Saunders ............................ 180/68.5 |
| 2,104,771 | 1/1938 | Saunders ............................ 180/68.5 |
| 2,104,772 | 1/1938 | Saunders ............................ 180/68.5 |
| 2,104,773 | 1/1938 | Saunders ............................ 180/68.5 |
| 2,106,883 | 2/1938 | Black ................................. 180/68.5 |
| 2,133,577 | 10/1938 | Saunders ............................ 180/68.5 |
| 4,006,280 | 2/1977 | Walker et al. ....................... 429/98 |
| 4,858,565 | 8/1989 | King ................................. 123/41.31 |
| 5,082,075 | 1/1992 | Karolek et al. ..................... 180/68.2 |

FOREIGN PATENT DOCUMENTS

| | | | |
|---|---|---|---|
| 0199611 | 10/1986 | European Pat. Off. ...... H01M 8/24 |
| 10521 | 7/1953 | Fed. Rep. of Germany ......... H01M 10/50 |
| 2451221 | 5/1976 | Fed. Rep. of Germany ......... B60H 1/00 |
| 3316512 | 11/1984 | Fed. Rep. of Germany ......... B60R 16/04 |
| 3600190 | 7/1986 | Fed. Rep. of Germany ......... B60K 11/08 |
| 9002249 | 6/1990 | Fed. Rep. of Germany ......... H01M 10/50 |
| 1136652 | 12/1955 | France ......................... B60K 11/02 |
| 2601907 | 1/1988 | France ......................... B60K 11/04 |
| 62-2471 | 5/1987 | Japan ......................... H01M 10/50 |
| 63-62168 | 4/1988 | Japan ......................... H01M 10/50 |
| 63-62169 | 4/1988 | Japan ......................... H01M 10/50 |
| 1-47640 | 2/1989 | Japan ......................... B60R 16/04 |
| 103792 | 2/1917 | United Kingdom ........ 21K9/45/02 |

Primary Examiner—Richard M. Camby
Attorney, Agent, or Firm—Jacques M. Dulin; Thomas C. Feix

[57] ABSTRACT

A motor vehicle battery cooling arrangement wherein the battery is enclosed by a housing which includes an air inlet port connected to an air guide disposed in front of the vehicle's radiator and cooling fan and an air outlet port connected to the outside. When the vehicle is moving, air impacting at the air guide enters the air inlet port and exits the air outlet port thus cooling the battery. When the vehicle is stationary or when it is very hot and the fan is turned on, the direction of air flow through the battery housing is reversed as the fan induced air flow at the air guide produces a partial vacuum which sucks hot air away from the battery housing through the air inlet port. Cooler fresh air is drawn into the battery housing through the air outlet port. In an alternate embodiment, the air inlet port is connected to the front portion of the engine compartment and the air outlet port is connected to the scoop or shroud housing for the cooling fan located behind the radiator. During fan operation, the partial vacuum which forms in the fan scoop draws hot air out from the battery housing via the air outlet port. In normal driving conditions, when the fan is not working, the normal flow of air impacts the front of the vehicle and forces air through the air inlet port to the battery housing and the air flow then exits through the air outlet port to the fan scoop and from there again reaches the outside.

11 Claims, 1 Drawing Sheet

VEHICLE STATIONARY

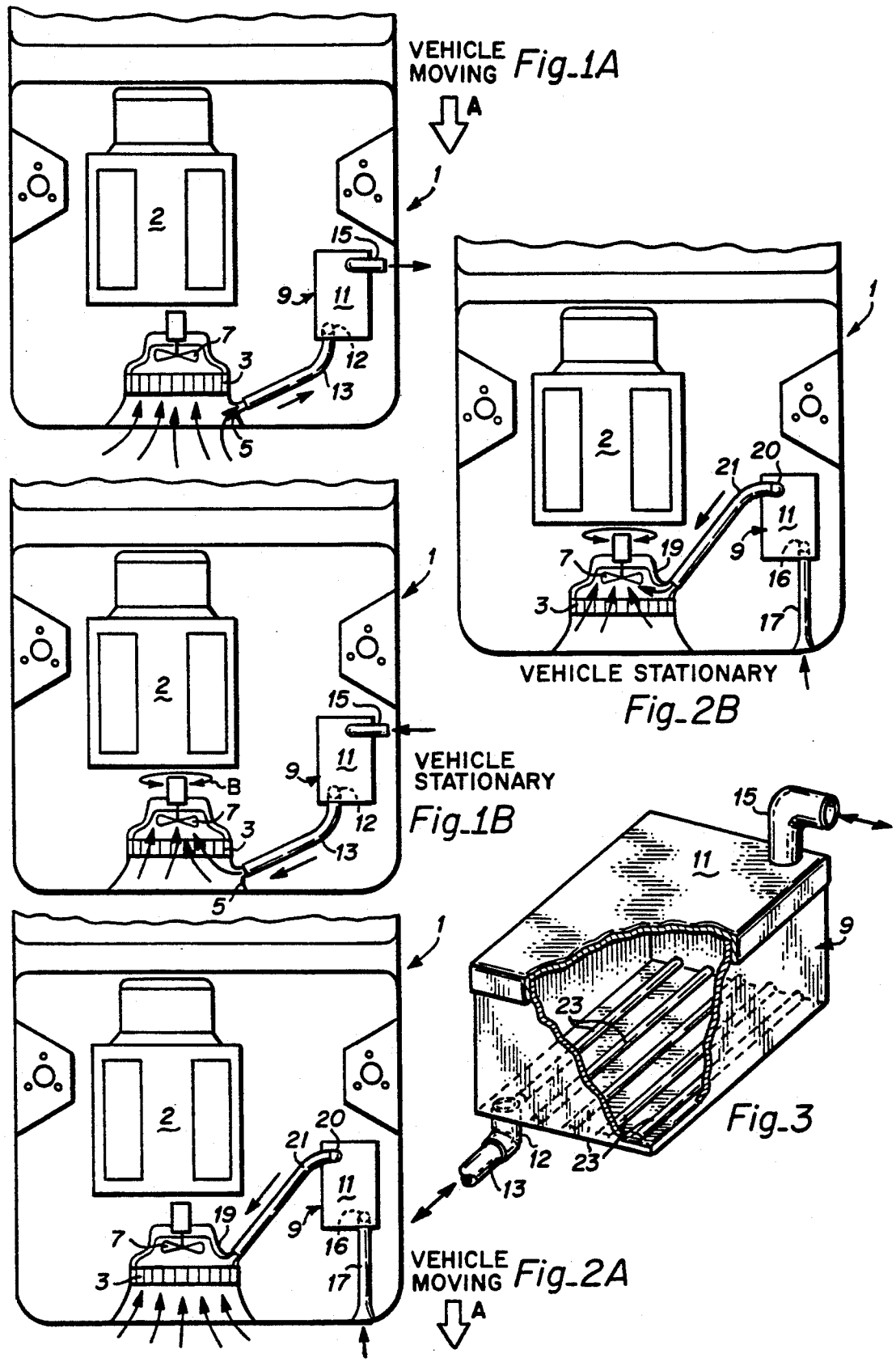

ARRANGEMENT FOR COOLING THE BATTERY OF A MOTOR VEHICLE

FIELD

The present invention relates generally to motor vehicle battery temperature control and more particularly to a motor vehicle battery cooling arrangement which provides a continuous flow of cooling air across the battery surface irrespective of whether the vehicle is moving or is stationary.

BACKGROUND

In the field of motor vehicle batteries, it is desirable to protect the battery from the extremes in temperature produced by the engine and the exhaust emission control apparatus. It is well known that excessively high temperatures have a decided detrimental effect on the motor vehicle battery's operating life. While some thermal protection may be afforded by shielding the battery from the heat producing sources in the engine compartment through the use of panel-type enclosures, it is also necessary to ensure that the battery receives proper ventilation in order to exhaust the corrosive acid fumes and heat produced by the battery itself.

Japanese patent abstract 1-47640 discloses a cooling arrangement for a motor vehicle battery wherein the battery is positioned immediately behind one of the motor vehicle headlights and is partitioned from the engine by use of several partition boards which form a box-like enclosure for the battery. The battery enclosure includes a front panel which is in air communication with a cutout in the headlight and an air outlet port disposed in the rear panel portion thereof adjacent the front wheel housing. In operation, when the vehicle is moving, the battery compartment is ventilated by cool air entering through the headlight opening. Hot air within the enclosure is exhausted through the air outlet port and eventually exits to the wheel housing. In this fashion, the battery remains cool and is basically unaffected by the engine heat during driving operation. However, when the vehicle is stationary, the air circulation through the battery enclosure is not sufficient to provide adequate cooling.

In order to improve the air circulation through a battery enclosure when the vehicle is stationary, it has been proposed to position the battery within a first housing which, in turn, is received within a second outer battery enclosure. The outer enclosure is provided with a ventilation opening and an evacuation channel. The evacuation channel is preferably sloped upwards in order to create a chimney effect so that hot air is caused to be carried away from the battery and fresh air is caused to be sucked into the enclosure through the ventilation opening. In practice, however, it has been found that sufficient cooling for the battery cannot be achieved in this way.

From U.S. Pat. No. 2,104,765 issued to Saunders, it is known to provide a battery enclosure having an air inlet port and air outlet port with a false bottom and sides for supporting the battery a distance away from the walls of the battery enclosure. In this arrangement, a flue is created which permits air flow across diagonally opposite top and bottom corners of the enclosure. Saunders also discloses an air inlet port with a connecting inlet tube having a belled mouth positioned near the fan such that positive air induction to the enclosure is provided by the fan blast. In this arrangement, the belled mouth of the air inlet tube is located behind the fan which, in turn, is located behind the radiator. Thus so positioned, the air inlet tube is blocked by the radiator from receiving pressurized air flow which enters the forward portion of the engine compartment when the vehicle is moving. This requires that the fan to be operated at all times to ensure adequate cooling air flow to the battery. In many modern day vehicles, operation of the cooling fan for the radiator is temperature dependent whereby fan activation occurs when the engine temperature exceeds a preselected threshold level such as when it is very hot outside or when the vehicle is stationary or moving slowly.

Accordingly, there is a need in the art for a simple low cost arrangement for cooling a battery of a motor vehicle which provides sufficient flow of cooling air across the battery irrespective of whether the motor vehicle is moving or is stationary. There is also a need for such a battery cooling arrangement which does not require additional power means for providing cooling air flow to the battery while the motor vehicle is stationary.

THE INVENTION

Objects

It is a primary object of the present invention to provide a cooling arrangement for a battery of a motor vehicle which includes a battery housing having an air inlet port and air outlet port for continuously ventilating the battery irrespective of whether the vehicle is moving or is stationary and wherein a first one of the air ports is disposed connected adjacent the cooling fan of the motor vehicle whereby activation of the fan generates a vacuum in the region of the first air port thus sucking hot air from the battery housing out therethrough and drawing cooler outside air into the battery housing via the other air port.

It is another object of the present invention to provide an motor vehicle battery cooling arrangement of the type described whereby the air inlet and outlet ports are arranged at diagonally opposed top and bottom corners of the battery housing to ensure full ventilation of the battery.

Still other and further objects will be evident from the specification, drawings and claims.

DRAWINGS

FIG. 1a is a schematic top view of a motor vehicle engine compartment illustrating the direction of air flow through the battery cooling arrangement of the present invention for the case where the motor vehicle is moving in a forward direction.

FIG. 1b is a schematic top view similar to FIG. 1a illustrating the direction of air flow through the battery cooling arrangement of the present invention when the motor vehicle is stationary and the cooling fan is activated.

FIG. 2a is a schematic top view of an engine compartment of a motor vehicle illustrating the air flow through a battery cooling arrangement constructed in accordance with a second embodiment of the present invention for the case where the vehicle is moving in a forward direction.

FIG. 2b is a schematic top view similar to FIG. 2a showing the direction of air flow through the second embodiment battery cooling arrangement of FIG. 2a for the case where the vehicle is stationary and the cooling fan is activated.

FIG. 3 is an isometric view in partial cross-section of the battery housing of FIGS. 1a, 1b (battery omitted for clarity) illustrating the battery supporting ribs formed along the upper surface of the bottom wall of the battery housing.

SUMMARY

The invention comprises an arrangement for cooling the battery of a motor vehicle wherein the battery is enclosed within a box-like housing which includes an air inlet port provided to the bottom wall at the front portion of the housing and an air outlet port provided to a rear upper housing wall. The battery cooling arrangement is preferably implemented within the engine compartment of a motor vehicle of the type which includes a radiator located forward of the engine, an air guide located in front of the radiator for directing air into the radiator and a cooling fan located behind the radiator. The fan is operative to switch on and draw air from the air guide through the radiator to cool the refrigerant liquid in the radiator when the ambient temperature is very hot or when the vehicle is stationary. Alternatively, the cooling fan may be operated at all times that the engine is running and preferably for a short time after the engine is turned off.

For the situation where the motor vehicle is moving in a forward direction, the normal flow of air is directed into the air guide in front of the radiator. This causes an impact (position) pressure to form in the air guide and forces fresh air into the battery housing through the air inlet port. The air which is heated by the battery is then exhausted through the air outlet port. The air inlet port of the battery housing is connected to the air guide such that when the vehicle is stationary or when it is very hot and the fan is turned on, the suction of air from the air guide through the radiator produces a partial vacuum (negative pressure) in the air guide which sucks hot air away from the battery housing through the air inlet port. This, in turn, draws cooler fresh air into the battery housing through the air outlet port which is connected to the outside, preferably adjacent the front wheel well. Thus, in this situation, the flow of cooling air through the battery housing is reversed.

The connecting members for the air inlet and outlet ports may be fabricated as flexible hoses, preferably made of plastic, thus enabling great flexibility with respect to the placement or installation of the battery within the engine compartment.

In the preferred best mode of the invention, the air outlet port is directly connected to the outside air. For this purpose, an outlet duct (or flexible plastic tube) may emerge from the engine compartment at the wheel housing or preferably in a region of partial vacuum just outside the motor vehicle body so that the entraining effect of the air flowing beneath or around the motor vehicle provides a vacuum thereby increasing the convection of hot air from the battery. An example region is the joint connection of the front mudflap and fender in the wheel housing. In an alternative to providing a complete encapsulation of the battery, it is also possible to screen out only a portion of the battery from the engine. For example, the forward facing wall of the battery housing may be omitted.

In an alternate embodiment for the battery cooling arrangement, the air inlet port is connected directly to the front portion of the engine compartment and the air outlet port is connected to the scoop or shroud housing for the cooling fan. In normal driving conditions, when the fan is not working, the normal flow of air which impacts the front of the vehicle is forced through the air inlet port and enters the battery housing. The heated air in the housing then exits through the air outlet port to the fan scoop and from there again reaches the outside. When the fan is switched on, e.g., where the temperature level is very high or the vehicle is stationary, a partial vacuum forms in the fan scoop or shroud housing adjacent the cooling fan and draws air out of the battery housing via the air outlet port, thus supplementing the cooling effect provided by the air flow entering the battery housing from the air inlet port. In both operating conditions (i.e., either with or without the fan working), the direction of air flow remains the same. Therefore, unlike the first embodiment, there is no reversal of the direction for the cooling air flow across the battery when the vehicle is moving or when it is stationary.

In both embodiments, the air inlet port is preferably located in a lower forward corner portion of the battery housing and the air outlet port is located in a diagonally opposite upper corner portion of the battery housing. Also, the bottom wall of the battery housing preferably includes a plurality of ribbed members to increase the exposed surface area of the battery and permit more cooling air flow across the battery.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1a shows in schematic fashion a top view of an engine compartment 1 of a motor vehicle which is moving in a forward direction as indicated by directional arrow A. The engine compartment includes an engine 2 having a radiator 3 positioned in front thereof in the known way. The radiator 3 is adapted to circulate water or a like coolant for engine cooling purposes. As is conventional, an air guide 5 is provided for directing the flow of oncoming air into the radiator 2 as the vehicle moves in the forward direction (arrow A). Also, as is conventional, a cooling fan 7 is positioned behind the radiator 2 and is operative to turn on to provide adequate throughput of cooling air to the radiator when the vehicle is not moving or when it is very hot. The fan 7 may be either operated in a suction mode to draw air from the air guide 5 through the radiator 2 or in a blowing mode for forcing air through the radiator 2 in the forward direction towards the front of the vehicle. In the preferred best mode of the invention, the fan used is of the sucker type as this maintains the same directional flow of air through the radiator under all vehicle operating conditions.

The engine compartment 1 also accommodates a housing 9 for a battery (not shown) of the vehicle. The battery housing 9 preferably fully encapsulates the battery and includes a cover 11 which is removable to permit access for maintenance or replacement of the battery. A flexible air duct 13, preferably plastic tube, connects the air guide 5 to an air inlet port 12 at the forward bottom corner portion of the battery housing 9. A single air duct member may be used in place of the individual air inlet port and connecting air inlet duct. The cover 11 also accommodates a duct piece 15 or air outlet port arranged at an upper corner of the housing 9 diagonally opposite the air inlet port 12. The air outlet duct or port 15 connects the interior space of the battery housing 9 to the outside air and is preferably extended into the region of the joint between the engine hood and the left front fender (neither one shown). In an alternate embodiment, the outlet duct 15 is connected directly to the outside air by connection to an opening in the front wheel housing (not shown).

In normal driving operation, air impacts the front of the vehicle and is received within the air guide 5 and a portion of the impacting air flow is forced into the battery housing 9 via tube or air duct 13 and air inlet port 12. The air heated by the battery then exits the battery housing 9 via the outlet duct 15. The direction of air flow for this normal driving condition is illustrated by the arrows in FIG. 1a.

FIG. 1b shows the direction of cooling air flow through the battery cooling arrangement for the case where the vehicle is stationary. In this instance, there is little or no air impact pressure at the air guide 5 and therefore little, if any, cooling air flow directed to the radiator 3. Accordingly, the cooling fan 7 is turned on (as indicated by Arrow B) in order to suck or draw air from the air guide 5 through the radiator 3. This creates a region of vacuum in the air guide which, in turn, draws hot air from inside the battery housing 9 out through port 12 and tube 13. This, in turn, causes relatively cool outside air to be drawn into the housing 9 through the port or duct 15, thus cooling the battery. The diagonally opposed top and bottom corner arrangement of the inlet and outlet ports 12 and 15 in the battery housing 9 enables a good throughput of air flow through the housing to provide effective cooling for the battery.

FIGS. 2a and 2b show an alternate embodiment for the battery cooling arrangement wherein the battery housing 9 includes a first air inlet port 16 disposed at a lower forward corner portion of the housing 9 and is connected to the outside air at the front end of the vehicle by a tube 17 and an air outlet port 20 disposed at a diagonally opposite upper corner portion of the housing 9 which is connected to the fan scoop or shroud housing 19 by a tube 21. FIG. 2a shows the vehicle moving in a forward direction as indicated by directional arrow A. In this case, a portion of the oncoming air flow impacting in the front of the vehicle is directed into the battery housing 9 via the tube 17 and lower air inlet port 16 and exits the battery housing 9 at the upper outlet port 20 where it is then directed to the fan scoop or shroud 19. As is best seen in FIG. 2b, when the vehicle is stationary and the fan 7 is working, a vacuum forms in the fan scoop 19 which has the effect of sucking air out from the battery housing 9 via the tube 21 and outlet port 21. This sucking action also draws cooling air from the outside through the tube 17 and lower inlet port 16. In this embodiment, the direction of air flow through the battery housing remains the same when the vehicle is stationary or is moving and is indicated by the plurality of small arrows.

FIG. 3 is an isometric view of a preferred embodiment for the battery housing 9 showing the provision of a plurality of rib members 23 along the upper surface of the housing bottom wall. The rib members 22 permit cooling air entering (or exiting) from the inlet port 12 to flow across the underside of the battery (not shown) to dissipate a greater amount of heat from the battery. The hot air heated by the battery is then exhausted at the outlet duct 15 as described above with reference to FIGS. 1a-1b. The preferred diagonally corner opposed location of the inlet and outlet ports are as shown in FIG. 3. This arrangement provides for the most efficient cooling throughput of air across the battery with a minimum length of tube connections to the cooling fan region (for the air inlet port 12) and the outside (for the air outlet port 15).

While not specifically shown or described, it will be appreciated by those skilled in the art that similar upraised ribbing structure may be provided to the bottom battery support wall and/or side walls of the cooling arrangement described as the alternate embodiment in FIGS. 2a-2b. It should also be understood that various other modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. A motor vehicle battery cooling arrangement for water cooled motor vehicles of the kind having a cooling fan and fan scoop positioned behind a radiator and an air guide positioned in front of the radiator, said battery cooling arrangement comprising in operative combination:
   a) a housing for enclosing at least a portion of a motor vehicle battery;
   b) said housing including an air inlet and an air outlet for receiving and exhausting a continuous throughput of air for cooling said battery; and
   c) said air inlet connects said housing to said air guide so that:
      i) during conditions of sufficient incoming air flow to said radiator, an impact pressure forms in said air guide and forces cool air to enter said housing via said air inlet and hot air heated by said battery to exit via said air outlet;
      ii) during conditions of insufficient incoming air flow to said radiator, operation of said cooling fan forms a partial vacuum in said air guide which sucks hot air from said housing via said air inlet and draws cool air into said housing via said air outlet.

2. A motor vehicle battery cooling arrangement as in claim 1 wherein said air outlet is connected to the outside air at a region of negative pressure when said vehicle is moving.

3. A motor vehicle battery cooling arrangement as in claim 1 wherein:
   a) said air inlet is formed in a bottom wall of said housing; and
   b) said air outlet is formed in a top wall of said housing.

4. A motor vehicle battery cooling arrangement as in claim 3 wherein said air inlet and said air outlet are located at diagonally opposite corners of said housing.

5. A motor vehicle battery cooling arrangement as in claim 3 wherein said housing bottom wall includes a plurality of spaced apart upraised rib members.

6. A motor vehicle battery cooling arrangement as in claim 4 wherein said housing bottom wall includes a plurality of spaced apart upraised rib members.

7. A motor vehicle battery cooling arrangement for water cooled motor vehicles of the kind having a cooling fan and fan scoop positioned behind a radiator and an air guide positioned in front of the radiator, said battery cooling arrangement comprising in operative combination:
   a) a housing for enclosing at least a portion of a motor vehicle battery;
   b) said housing including an air inlet and an air outlet for receiving and exhausting a continuous throughput of air for cooling said battery; and
   c) said air inlet is connected to the outside air at a forward end of said motor vehicle and said air outlet is connected to said fan scoop in front of said fan so that:
      i) during conditions of sufficient incoming air flow to said radiator, impact pressure which forms at the front end of said vehicle forces cool outside air to enter said housing via said air inlet and hot air heated by said battery to exit via said air outlet to said fan scoop;
      ii) during conditions of insufficient incoming air flow to said radiator, operation of said cooling fan forms a partial vacuum in said fan scoop which sucks hot air from said housing via said air outlet and draws cool outside air into said housing via said air inlet.

8. A motor vehicle battery cooling arrangement as in claim 7 wherein:
   a) said air inlet is formed in a bottom wall of said housing; and
   b) said air outlet is formed in a top wall of said housing.

9. A motor vehicle battery cooling arrangement as in claim 8 wherein said air inlet and said air outlet are located at diagonally opposite corners of said housing.

10. A motor vehicle battery cooling arrangement as in claim 8 wherein said housing bottom wall includes a plurality of spaced apart upraised rib members.

11. A motor vehicle battery cooling arrangement as in claim 9 wherein said housing bottom wall includes a plurality of spaced apart upraised rib members.

* * * * *